(12) United States Patent
Shim et al.

(10) Patent No.: US 11,518,228 B2
(45) Date of Patent: Dec. 6, 2022

(54) POWERTRAIN FOR HYBRID VEHICLE

(71) Applicants: HYUNDAI MOTOR COMPANY, Seoul (KR); KIA MOTORS CORPORATION, Seoul (KR)

(72) Inventors: Hyu Tae Shim, Hwaseong-si (KR); Bong Hyun Cho, Gunpo-si (KR); Jae Young Jeon, Osan-si (KR); Byung Dae Choi, Seoul (KR); Hyung Min Kim, Suwon-si (KR); Jin Yong Kim, Incheon (KR); Gwang Soo Hwang, Hwaseong-si (KR); Jun Seong Kang, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/081,225

(22) Filed: Oct. 27, 2020

(65) Prior Publication Data
US 2021/0394607 A1    Dec. 23, 2021

(30) Foreign Application Priority Data

Jun. 18, 2020    (KR) .................. 10-2020-0074489

(51) Int. Cl.
*F16H 3/72*    (2006.01)
*B60K 6/38*    (2007.10)
(Continued)

(52) U.S. Cl.
CPC .............. *B60K 6/365* (2013.01); *B60K 6/26* (2013.01); *B60K 6/38* (2013.01); *F16H 3/663* (2013.01);
(Continued)

(58) Field of Classification Search
CPC .. B60K 6/365; B60K 6/26; B60K 6/38; F16H 3/663; F16H 3/72; F16H 2200/0056;
(Continued)

(56) References Cited

U.S. PATENT DOCUMENTS

2002/0134634 A1*  9/2002  Ito .................... F16D 41/088
                                                          192/35
2003/0178237 A1*  9/2003  Terada ............... F16D 27/10
                                                          180/249

(Continued)

FOREIGN PATENT DOCUMENTS

KR    10-2009-0132758 A    12/2009

*Primary Examiner* — Stacey A Fluhart
*Assistant Examiner* — Farhana Pervin
(74) *Attorney, Agent, or Firm* — Lempia Summerfield Katz LLC

(57) ABSTRACT

A powertrain for a hybrid vehicle includes: a complex planetary gear set including a first rotary element, a second rotary element, a third rotary element, and a fourth rotary element; an input shaft connected with an engine and installed to be able to be selectively connected to each of the first rotary element and the second rotary element of the complex planetary gear set; a motor generator connected to the first rotary element of the complex planetary gear set; a first brake installed to be able to fixedly connect the second rotary element of the complex planetary gear set to a transmission case; a second brake installed to be able to fixedly connect the third rotary element of the complex planetary gear set to the transmission case; and an output shaft connected to the fourth rotary element of the complex planetary gear set.

4 Claims, 21 Drawing Sheets

(51) Int. Cl.
*B60K 6/365* (2007.10)
*B60K 6/26* (2007.10)
*F16H 3/66* (2006.01)

(52) U.S. Cl.
CPC ....... *B60Y 2200/92* (2013.01); *B60Y 2400/73* (2013.01); *F16H 3/72* (2013.01); *F16H 2200/0056* (2013.01); *F16H 2200/0065* (2013.01); *F16H 2200/2007* (2013.01); *F16H 2200/2023* (2013.01); *F16H 2200/2041* (2013.01); *F16H 2200/2043* (2013.01); *F16H 2200/2046* (2013.01)

(58) Field of Classification Search
CPC ..... F16H 2200/0065; F16H 2200/2007; F16H 2200/2023; F16H 2200/2041; F16H 2200/2043; F16H 2200/2046; B60Y 2200/92; B60Y 2400/73
See application file for complete search history.

(56) References Cited

U.S. PATENT DOCUMENTS

| | | | | |
|---|---|---|---|---|
| 2007/0286743 | A1* | 12/2007 | Ochab | F16D 41/088 417/313 |
| 2011/0021301 | A1* | 1/2011 | Asano | F16D 25/123 475/86 |
| 2013/0299298 | A1* | 11/2013 | Akiyoshi | F16D 27/112 192/71 |
| 2015/0159743 | A1* | 6/2015 | Palmer | F16D 47/04 74/650 |

* cited by examiner

| ITEMS | | OPERATING ELEMENT | | | |
|---|---|:---:|:---:|:---:|:---:|
| | | CL1 | CL2 | B1 | B2 |
| ENGINE MODE (PARALLEL MODE) | FIRST STAGE | O | | O | |
| | SECOND STAGE | O | | | O |
| | THIRD STAGE | O | O | | |
| | FOURTH STAGE | | O | | O |
| e-CVT MODE | | | O | | |
| EV MODE | FIRST STAGE | | | O | |
| | SECOND STAGE | | | | O |
| IN-STOP CHARGE MODE | | O | | | |

ENGINE (PARALLEL) MODE

S1   C1   R1
     R2   S2
     C2 e-CVT MODE

EV MODE

FIG. 15

| ITEMS | | OPERATING ELEMENT | | | | |
|---|---|---|---|---|---|---|
| | | CL1 | CL2 | B1 | B2 | CL3 |
| ENGINE MODE (PARALLEL MODE) | FIRST STAGE | O | | O | | O |
| | SECOND STAGE | O | | | O | O |
| | THIRD STAGE | O | O | | | O |
| | FOURTH STAGE | | O | | O | |
| e-CVT MODE | | | O | | | O |
| EV MODE | FIRST STAGE | | | O | | O |
| | SECOND STAGE | | | | O | O |
| IN-STOP CHARGE MODE | | O | | | | |

| ITEMS | | OPERATING ELEMENT | | | | | |
|---|---|---|---|---|---|---|---|
| | | CL1 | CL2 | B1 | B2 | D1 | D2 |
| ENGINE MODE (PARALLEL MODE) | FIRST STAGE | O | | O | | O | |
| | SECOND STAGE | O | | | O | O | |
| | THIRD STAGE | O | O | | | O | |
| | FOURTH STAGE | | O | | O | O | |
| e-CVT MODE | | | O | | | O | |
| e-CVT MODE | | | | | | | O |
| EV MODE | FIRST STAGE | | | O | | O | |
| | SECOND STAGE | | | | O | O | |
| | THIRD STAGE | | | | | O | O |
| IN-STOP CHARGE MODE | | O | | | | O | |

POWERTRAIN FOR HYBRID VEHICLE

CROSS REFERENCE TO RELATED APPLICATION

This application claims priority to and the benefit of Korean Patent Application No. 10-2020-0074489, filed on Jun. 18, 2020, the entire contents of which are incorporated herein by reference.

FIELD

The present disclosure relates to a powertrain structure for a hybrid vehicle.

BACKGROUND

The statements in this section merely provide background information related to the present disclosure and may not constitute prior art.

Hybrid vehicles are equipped with a powertrain that appropriately combines power from an engine and power from an electric motor so that power performance required for the vehicle can be achieved and fuel efficiency can be improved.

The powertrain of hybrid vehicles includes as few parts as possible, has a simple configuration, and is configured to implement as many shift ranges as possible to improve the fuel efficiency of an engine and achieve power performance required for the vehicles.

The foregoing is intended merely to aid in the understanding of the background of the present disclosure, and is not intended to mean that the present disclosure falls within the purview of the related art that is already known to those skilled in the art.

SUMMARY

The present disclosure provides a powertrain for a hybrid vehicle, which has a simple configuration to reduce costs and is more conveniently mounted in a vehicle. In particular, the powertrain is configured to implement as many shift ranges as possible to improve the fuel efficiency of an engine and sufficiently achieve power performance required for the vehicle.

In one form of the present disclosure, a powertrain for a hybrid vehicle includes: a complex planetary gear set including four rotary elements (i.e., a first rotary element, a second rotary element, a third rotary element, and a fourth rotary element); an input shaft connected with an engine and configured to be selectively connected to each of the first rotary element and the second rotary element of the complex planetary gear set; a motor generator connected to the first rotary element of the complex planetary gear set; a first brake configured to fixedly connect the second rotary element of the complex planetary gear set to a transmission case; a second brake configured to fixedly connect the third rotary element of the complex planetary gear set to the transmission case; and an output shaft connected to the fourth rotary element of the complex planetary gear set.

A first clutch may be disposed between the input shaft and the first rotary element of the complex planetary gear set, and a second clutch may be disposed between the input shaft and the second rotary element of the complex planetary gear set.

The complex planetary gear set may include a first planetary gear set and a second planetary gear set; the first rotary element may be implemented by connecting a first ring gear of the first planetary gear set and a second sun gear of the second planetary gear set; the second rotary element may be a second ring gear of the second planetary gear set; the third rotary element may be a first sun gear of the first planetary gear set; and the fourth rotary element may be implemented by connecting a first carrier of the first planetary gear set and a second carrier of the second planetary gear set.

The complex planetary gear set may include a first planetary gear set and a second planetary gear set; the first rotary element may be a first sun gear of the first planetary gear set; the second rotary element may be implemented by connecting a first carrier of the first planetary gear set and a second carrier of the second planetary gear set; the third rotary element may be implemented by connecting a first ring gear of the first planetary gear set and a second sun gear of the second planetary gear set; and the fourth rotary element may be a second ring gear of the second planetary gear set.

The complex planetary gear set may be a Ravigneaux type planetary gear set; the first rotary element may be a first sun gear; the second rotary element may be a carrier; the third rotary element is a second sun gear; and the fourth rotary element may be a ring gear.

The complex planetary gear set may include a first planetary gear set and a second planetary gear set; the first rotary element may be a first sun gear of the first planetary gear set; the second rotary element may be implemented by connecting a first ring gear of the first planetary gear set and a second carrier of the second planetary gear set; the third rotary element may be a second sun gear of the second planetary gear set; and the fourth rotary element may be implemented by connecting a first carrier of the first planetary gear set and a second ring gear of the second planetary gear set.

The complex planetary gear set may include a double-pinion first planetary gear set and a single-pinion second planetary gear set; the first rotary element may be a first sun gear of the double-pinion first planetary gear set; the second rotary element may be implemented by connecting a first ring gear of the double-pinion first planetary gear set and a second carrier of the single-pinion second planetary gear set; the third rotary element may be implemented by connecting a first carrier of the double-pinion first planetary gear set and a second sun gear of the single-pinion second planetary gear set; and the fourth rotary element may be a second ring gear of the single-pinion second planetary gear set.

The powertrain may further include a third clutch between the first rotary element of the complex planetary gear set and the motor generator, wherein the third clutch may be connected in series to the first clutch between the first rotary element and the input shaft.

In another form of the present disclosure, a powertrain for a hybrid vehicle includes: a complex planetary gear set including a first rotary element, a second rotary element, a third rotary element, and a fourth rotary element; an input shaft connected with an engine and installed to be able to be selectively connected to each of the first rotary element and the second rotary element of the complex planetary gear set; a motor generator installed to be able to be independently connected to the first rotary element and the third rotary element of the complex planetary gear set; a first brake installed to be able to fixedly connect the second rotary element of the complex planetary gear set to a transmission case; a second brake installed to be able to fixedly connect the third rotary element of the complex planetary gear set to the transmission case; and an output shaft connected to the fourth rotary element of the complex planetary gear set.

The motor generator may include the first rotary element and the third rotary element of the complex planetary gear set through a two-way device, and the two-way device may be configured to be able to independently connect the motor generator to the first rotary element and the third rotary element using two different pistons that are driven by hydraulic pressure.

The two-way device may include: a retainer connected to the motor generator; a first hub connected to the first rotary element; a second hub connected to the second rotary element; a first piston sliding straight in the retainer to be engaged with the first hub; a second piston sliding straight in the retainer to be engaged with the second hub; and a casing surrounding the retainer, the first piston, and the second piston and providing hydraulic pressure for driving the first piston and the second piston.

A first clutch may be disposed between the input shaft and the first rotary element of the complex planetary gear set, and a second clutch may be disposed between the input shaft and the second rotary element of the complex planetary gear set.

The complex planetary gear set may include a first planetary gear set and a second planetary gear set; the first rotary element may be implemented by connecting a first ring gear of the first planetary gear set and a second sun gear of the second planetary gear set; the second rotary element may be a second ring gear of the second planetary gear set; the third rotary element may be a first sun gear of the first planetary gear set; and the fourth rotary element may be implemented by connecting a first carrier of the first planetary gear set and a second carrier of the second planetary gear set.

The complex planetary gear set may include a first planetary gear set and a second planetary gear set; the first rotary element may be a first sun gear of the first planetary gear set; the second rotary element may be implemented by connecting a first carrier of the first planetary gear set and a second carrier of the second planetary gear set; the third rotary element may be implemented by connecting a first ring gear of the first planetary gear set and a second sun gear of the second planetary gear set; and the fourth rotary element may be a second ring gear of the second planetary gear set.

The complex planetary gear set may be a Ravigneaux type planetary gear set; the first rotary element may be a first sun gear; the second rotary element may be a carrier; the third rotary element is a second sun gear; and the fourth rotary element may be a ring gear.

The complex planetary gear set may include a double-pinion first planetary gear set and a single-pinion second planetary gear set; the first rotary element may be a first sun gear of the double-pinion first planetary gear set; the second rotary element may be implemented by connecting a first ring gear of the double-pinion first planetary gear set and a second carrier of the single-pinion second planetary gear set; the third rotary element may be implemented by connecting a first carrier of the double-pinion first planetary gear set and a second sun gear of the single-pinion second planetary gear set; and the fourth rotary element may be a second ring gear of the single-pinion second planetary gear set.

According to the present disclosure, since as few parts as possible are employed and a simple configuration is implemented, it is possible to reduce costs and more conveniently mount a powertrain in a vehicle. Further, since as many shift ranges are implemented as possible, the fuel efficiency of an engine can be improved and power performance required for the vehicle can be sufficiently achieved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 15 is an operation mode table that can be applied to the sixth to tenth forms of the present disclosure;

Figure 1:
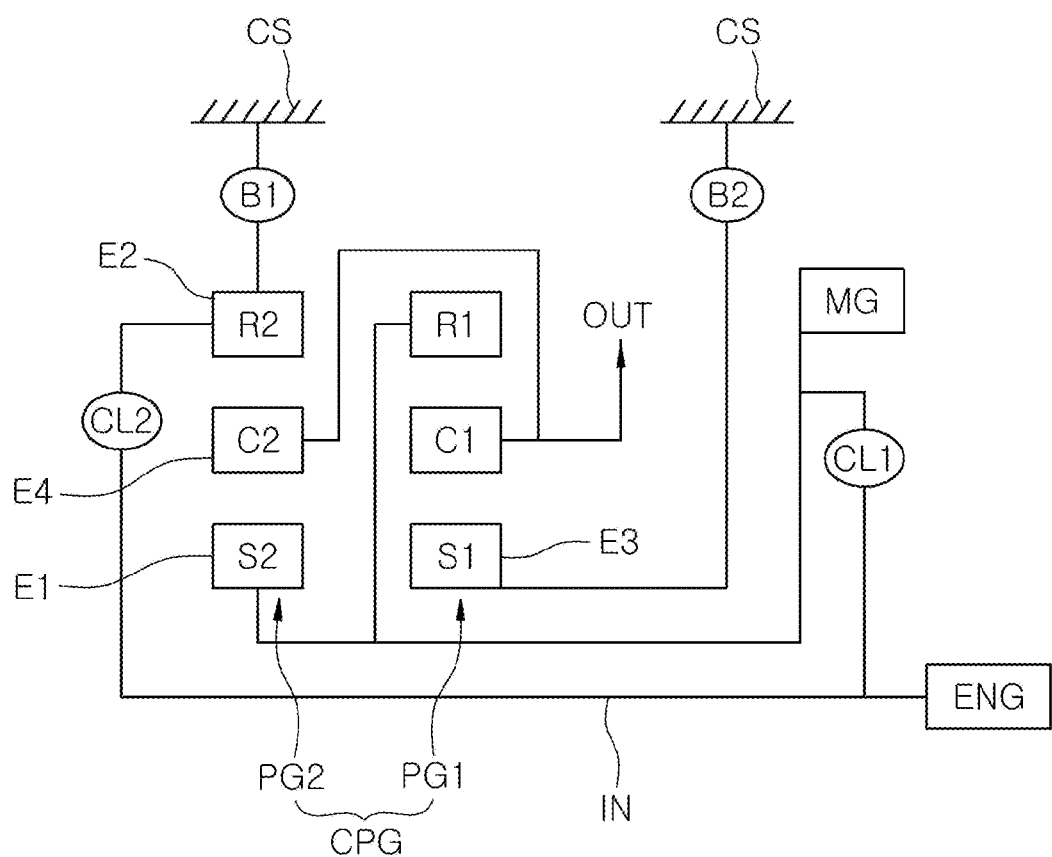
FIG. 1 is a diagram showing the configuration of a first form of a powertrain for a hybrid vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 5, first to fifth forms of a powertrain for a hybrid vehicle of the present disclosure commonly include: a complex planetary gear set CPG including four rotary elements; an input shaft IN connected with an engine ENG and installed to be able to be selectively connected to each of a first rotary element E1 and a second rotary element E2 of the complex planetary gear set CPG; a motor generator MG connected to the first rotary element E1 of the complex planetary gear set CPG; a first brake B1 installed to be able to fix the second rotary element E2 of the complex planetary gear set CPG; a second brake B2 installed to be able to fix a third rotary element E3 of the complex planetary gear set CPG; and an output shaft OUT connected to a fourth rotary element E4 of the complex planetary gear set CPG.

A first clutch CL1 is disposed between the input shaft IN and the first rotary element E1 of the complex planetary gear set CPG, and a second clutch CL2 is disposed between the input shaft IN and the second rotary element E2 of the complex planetary gear set CPG.

For reference, the first brake B1 and the second brake B2 are fixedly connected to a transmission case CS.

In the first form as illustrated in FIG. 1, the complex planetary gear set CPG includes: a first planetary gear set PG1, and a second planetary gear set PG2. In some forms of the present disclosure, the first rotary element E1 is implemented by connecting a first ring gear R1 of the first planetary gear set PG1 and a second sun gear S2 of the second planetary gear set PG2, the second rotary element E2 is a second ring gear R2 of the second planetary gear set PG2, the third rotary element E3 is a first sun gear S1 of the first planetary gear set PG1, and the fourth rotary element E4 is implemented by connecting a first carrier C1 of the first planetary gear set PG1 and a second carrier C2 of the second planetary gear set PG2.

For reference, a 'planetary gear set' means a single pinion planetary gear set and the term 'double pinion' will be specifically stated for a double pinion planetary gear set. Accordingly, first planetary gear set PG1 and the second planetary gear set PG2 are single pinion planetary gear sets each having three rotary elements.

Figure 2:
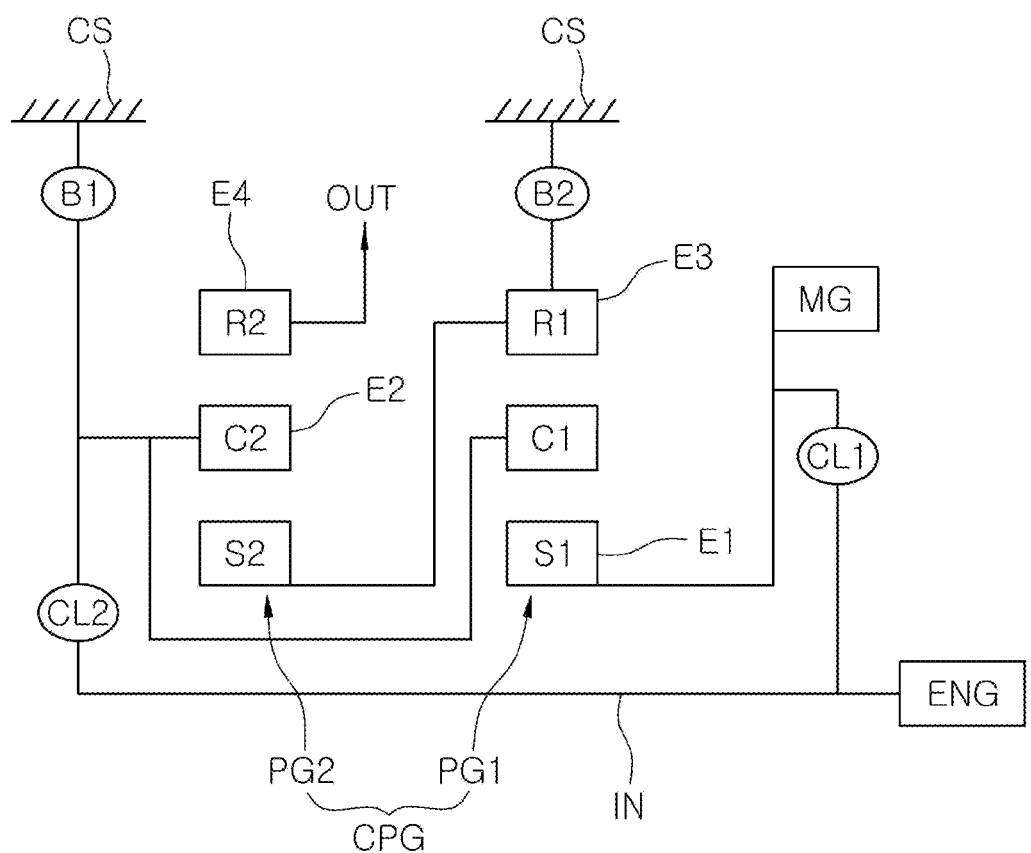
FIG. 2 is a diagram showing the configuration of a second form of a powertrain for a hybrid vehicle in another form of the present disclosure.

In the second form of FIG. 2, the complex planetary gear set CPG includes a first planetary gear set PG1 and a second planetary gear set PG2. In this exemplary form, the first rotary element E1 is a first sun gear S1 of the first planetary gear set PG1, the second rotary element E2 is implemented by connecting a first carrier C1 of the first planetary gear set PG1 and a second carrier C2 of the second planetary gear set PG2, the third rotary element E3 is implemented by connecting a first ring gear R1 of the first planetary gear set PG1 and a second sun gear S2 of the second planetary gear set PG2, and the fourth rotary element E4 is a second ring gear R2 of the second planetary gear set PG2.

Figure 3:
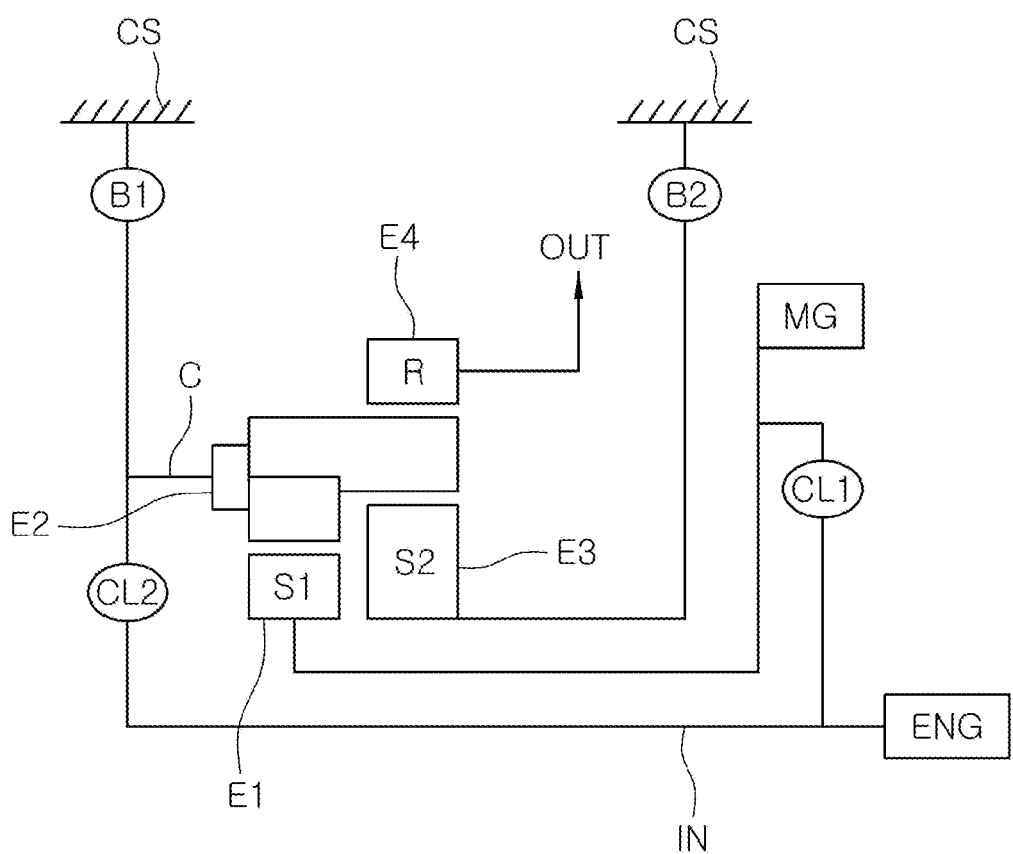
FIG. 3 is a diagram showing the configuration of a third form of a powertrain for a hybrid vehicle according to the present disclosure.

In the third form of FIG. 3, the complex planetary gear set CPG is a Ravigneaux type planetary gear set. In this form, the first rotary element E1 is a first sun gear S1, the second rotary element E2 is a carrier C, the third rotary element E3 is a second sun gear S2, and the fourth rotary element E4 is a ring gear.

Figure 4:
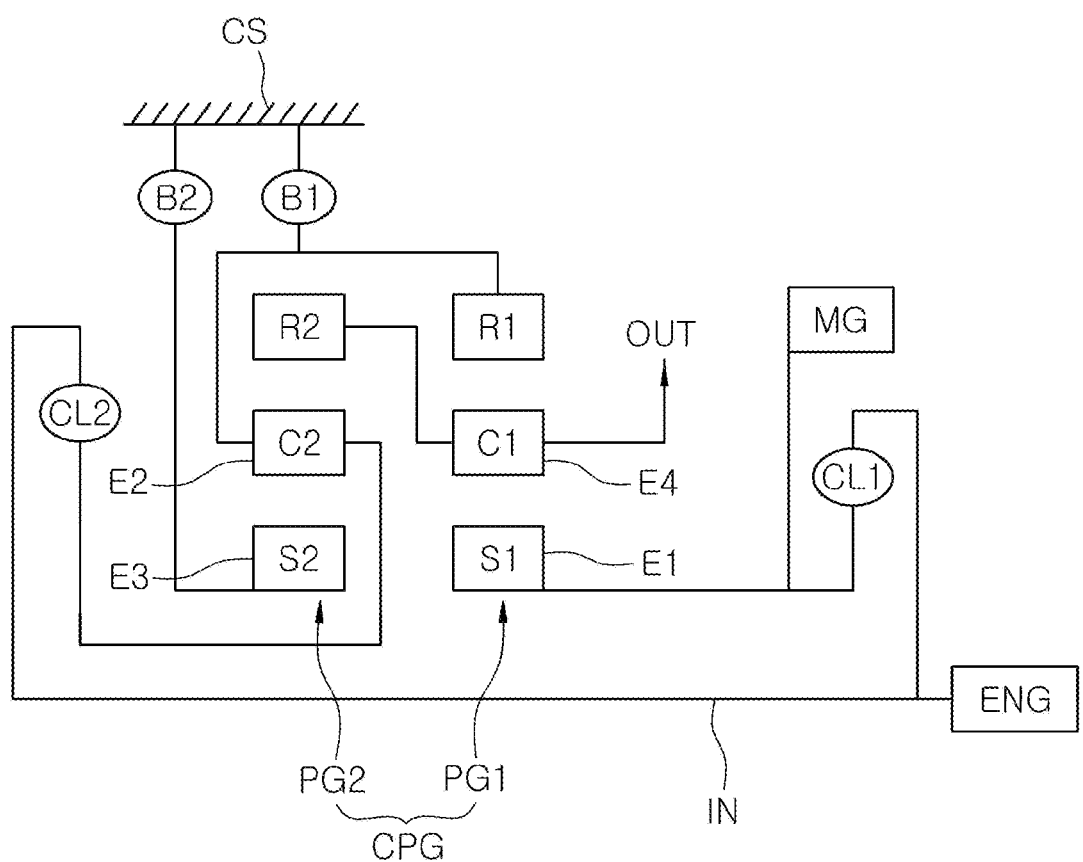
FIG. 4 is a diagram showing the configuration of a fourth form of a powertrain for a hybrid vehicle according to the present disclosure.

In the fourth form of FIG. 4, the complex planetary gear set CPG includes a first planetary gear set PG1 and a second planetary gear set PG2. In this form, the first rotary element E1 is a first sun gear S1 of the first planetary gear set PG1, the second rotary element E2 is implemented by connecting a first ring gear R1 of the first planetary gear set PG1 and a second carrier C2 of the second planetary gear set PG2, the third rotary element E3 is a second sun gear S2 of the second planetary gear set PG2, and the fourth rotary element E4 is implemented by connecting a first carrier C1 of the first planetary gear set PG1 and a second ring gear R2 of the second planetary gear set PG2.

Figure 5:
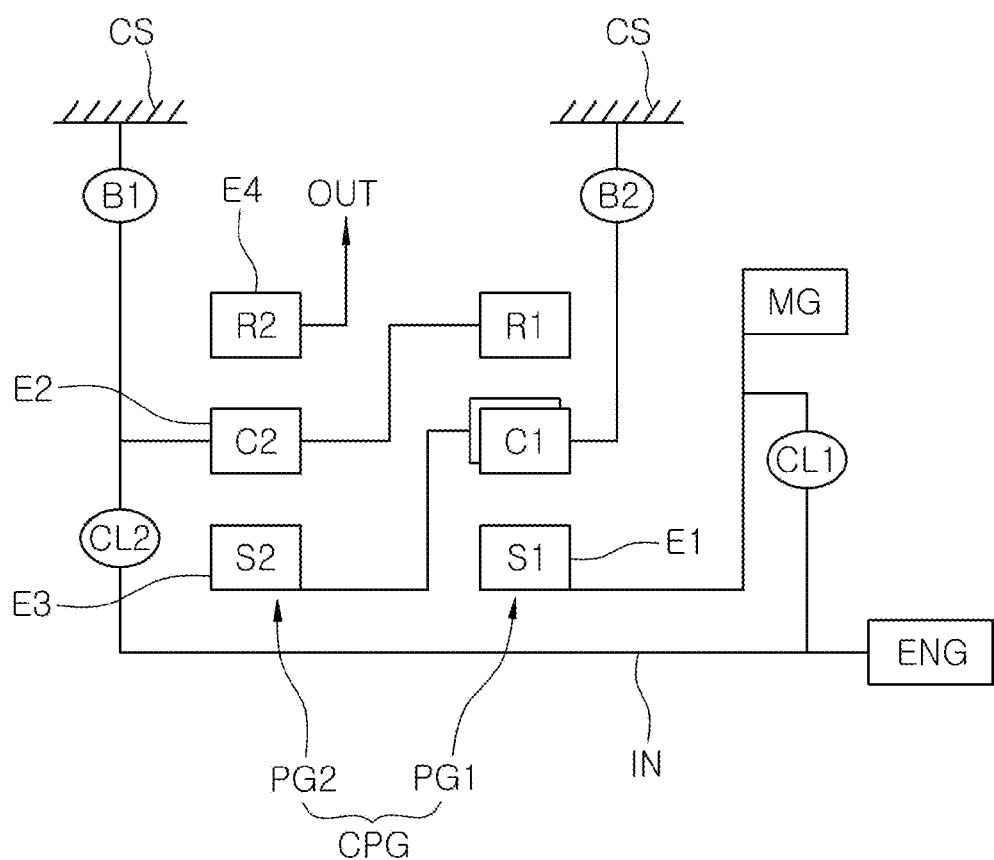
FIG. 5 is a diagram showing the configuration of a fifth form of a powertrain for a hybrid vehicle according to the present disclosure.

In the fifth form of FIG. 5, the complex planetary gear set CPG includes a double-pinion first planetary gear set PG1 and a single-pinion second planetary gear set PG2. In this form, the first rotary element E1 is a first sun gear S1 of the first planetary gear set PG1, the second rotary element E2 is implemented by connecting a first ring gear R1 of the first planetary gear set PG1 and a second carrier C2 of the second planetary gear set PG2, the third rotary element E3 is implemented by connecting a first carrier C1 of the first planetary gear set PG1 and a second sun gear S2 of the second planetary gear set PG2, and the fourth rotary element E4 is a second ring gear R2 of the second planetary gear set PG2.

Figures 6, 7:
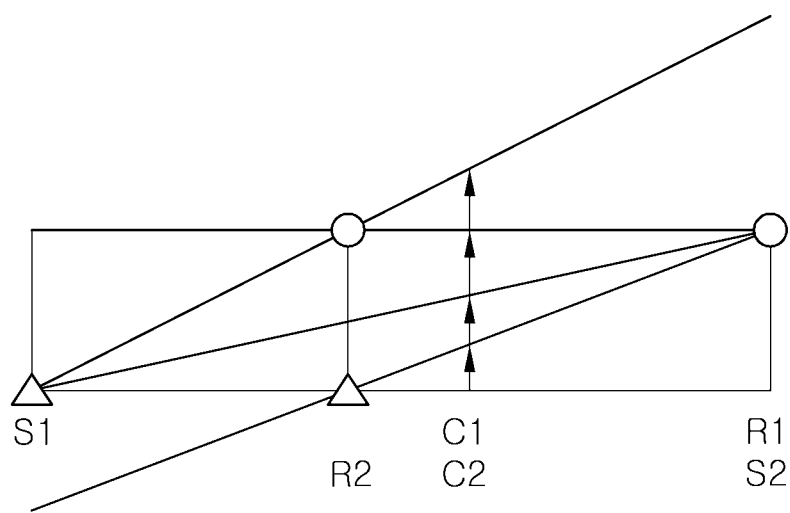
FIG. 6 is an operation mode table that can be applied to the first to fifth forms of the present disclosure.
FIG. 7 is a speed graph when an engine mode shown in FIG. 6 is applied to the first form.

All of the first to fifth forms can be operated on the basis of the operation mode table of FIG. 6, in which it is possible to implement an engine mode in which first to fourth stages at which a vehicle is driven only by the power from an engine are implemented, an e-CVT mode (electric Continuous Variable Transmission MODE) in which gear ratio can be continuously changed by changing the power of a motor generator MG with the engine in operation, an EV mode in which a first stage and a second stage at which a vehicle is driven only by the power from a motor generator MG are implemented, an in-stop charge mode in which charging is possible while a vehicle is stopped, etc.

For reference, it is possible to assist power by further driving the motor generator MG in the engine mode, so the engine mode may also be referred to as a parallel mode.

Figure 8:
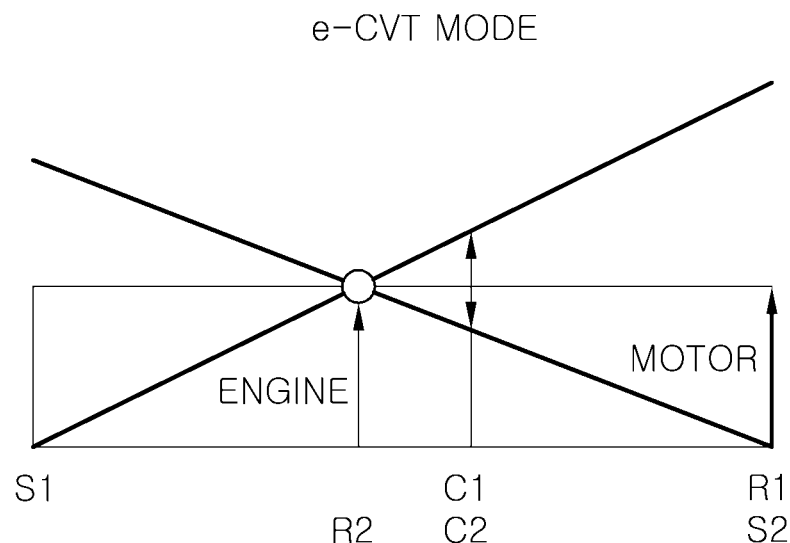
FIG. 8 is a speed graph when an e-CVT mode shown in FIG. 6 is applied to the first form.
Figure 9:
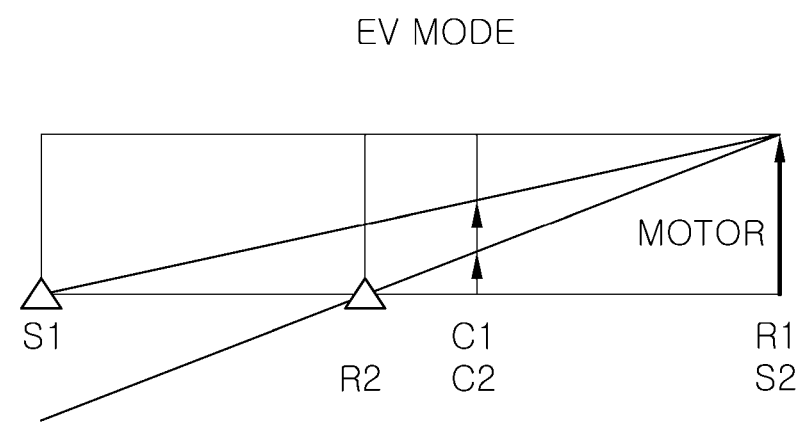
FIG. 9 is a speed graph when an EV mode shown in FIG. 6 is applied to the first form.
Figure 10:
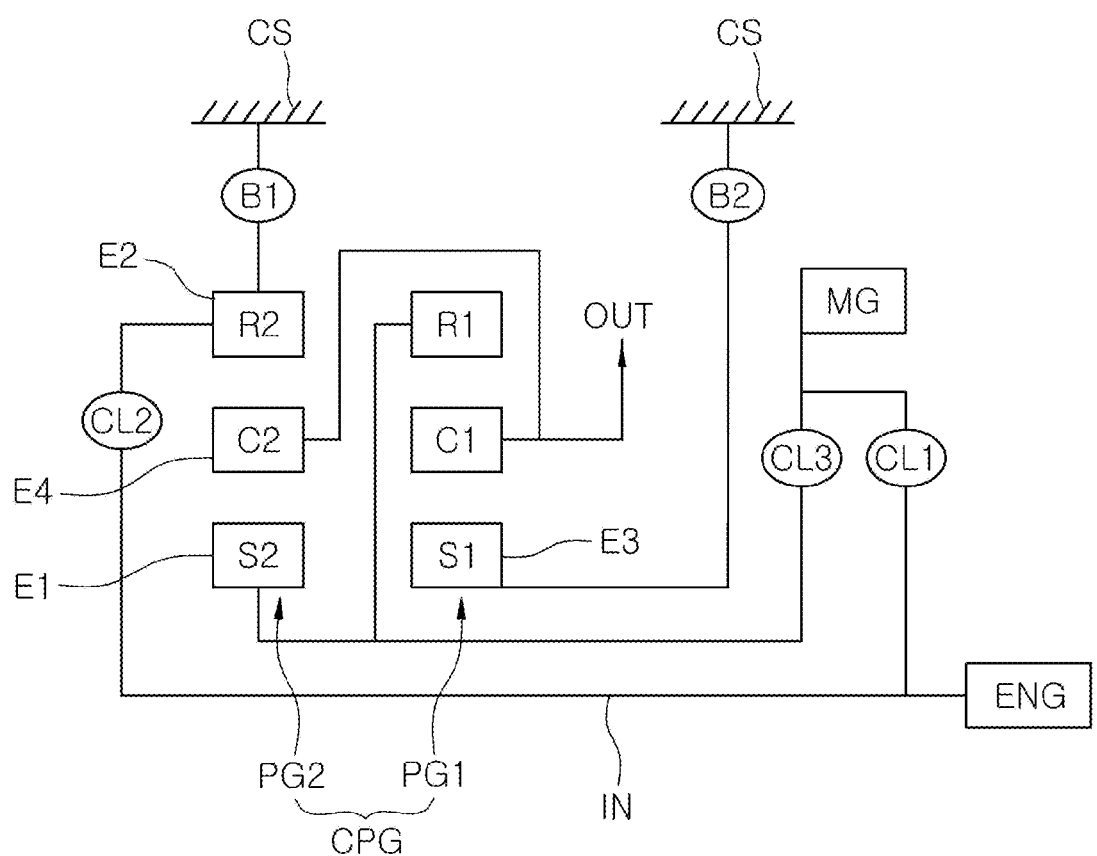
FIG. 10 is a diagram showing the configuration of a sixth form of a powertrain for a hybrid vehicle according to the present disclosure.
Figure 11:
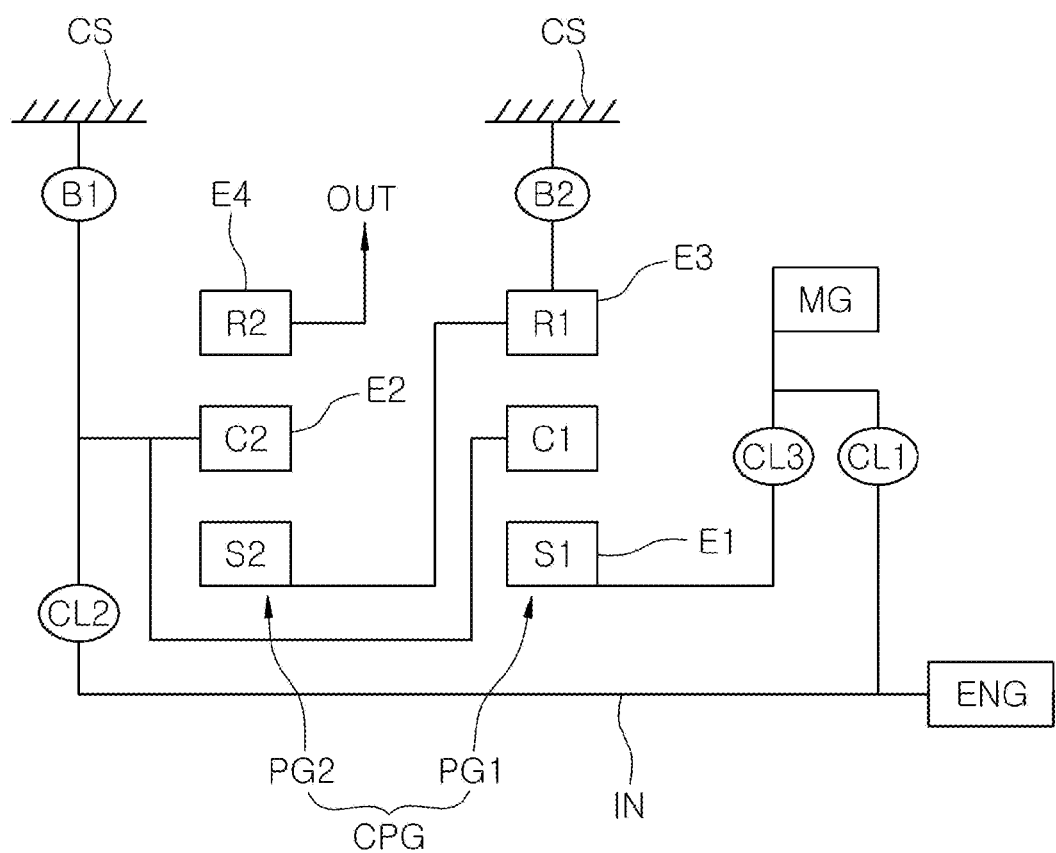
FIG. 11 is a diagram showing the configuration of a seventh form of a powertrain for a hybrid vehicle according to the present disclosure.
Figure 12:
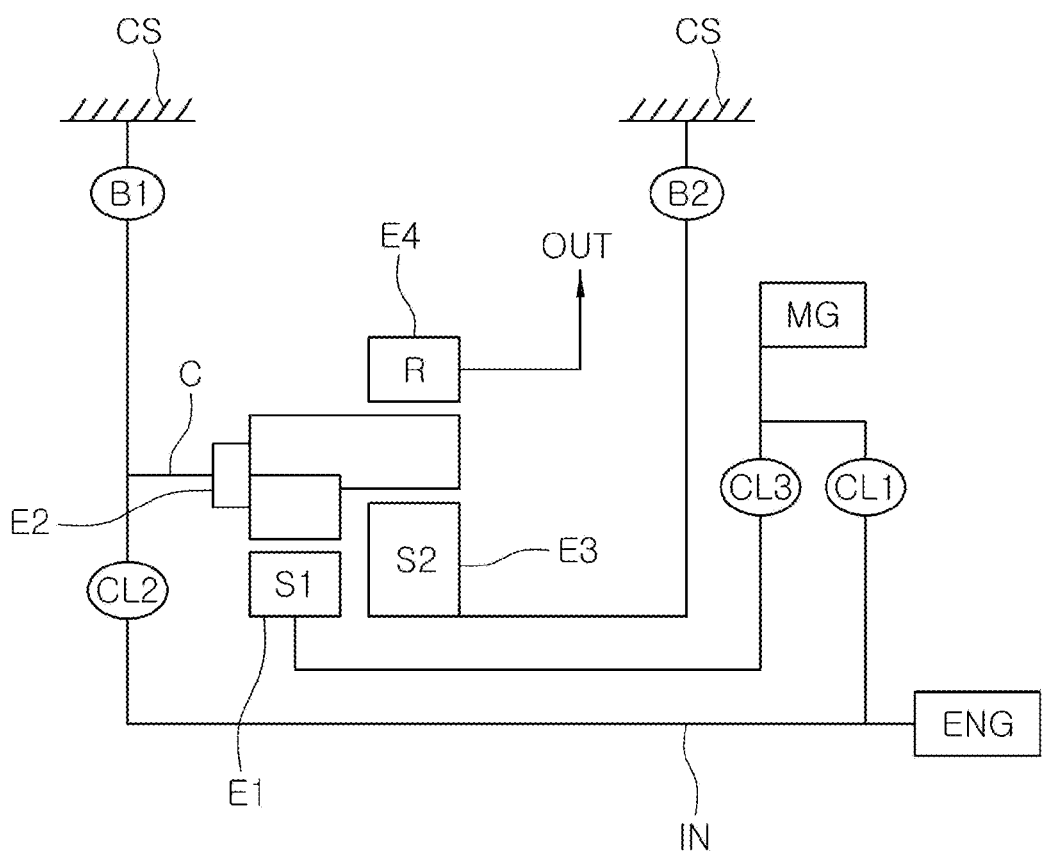
FIG. 12 is a diagram showing the configuration of an eighth form of a powertrain for a hybrid vehicle according to the present disclosure.
Figure 13:
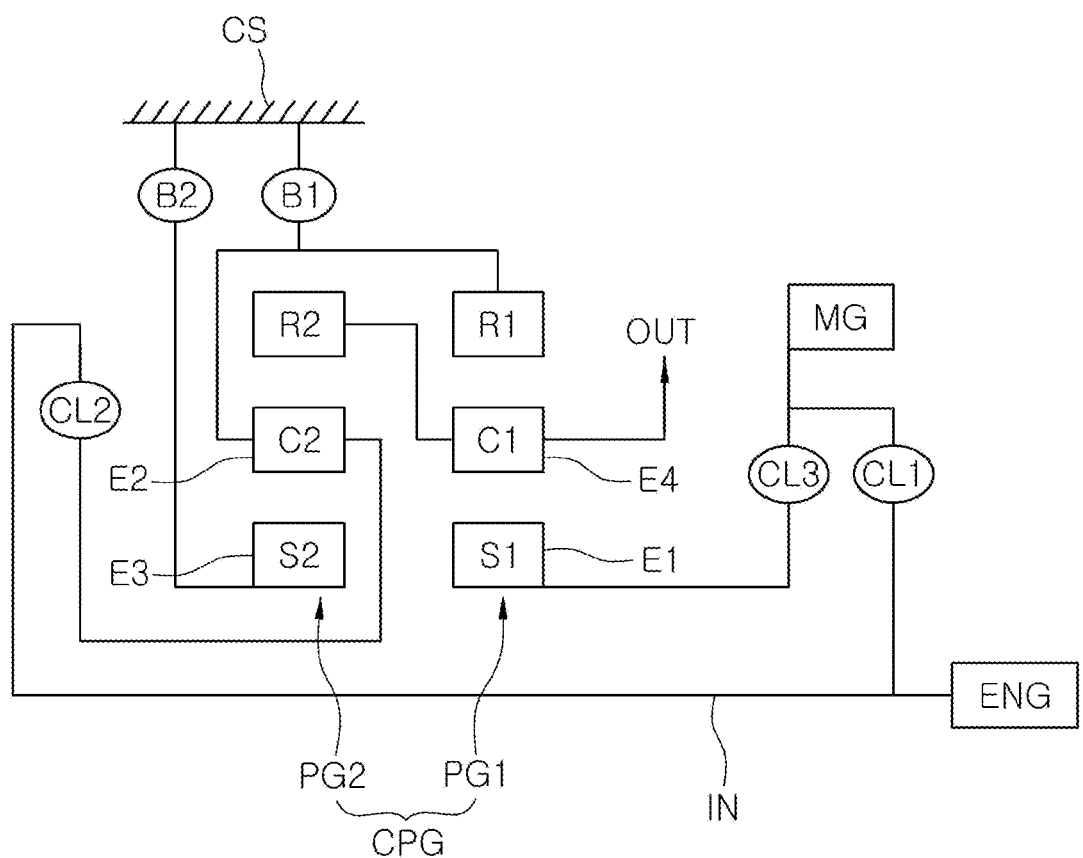
FIG. 13 is a diagram showing the configuration of a ninth form of a powertrain for a hybrid vehicle according to the present disclosure.
Figure 14:
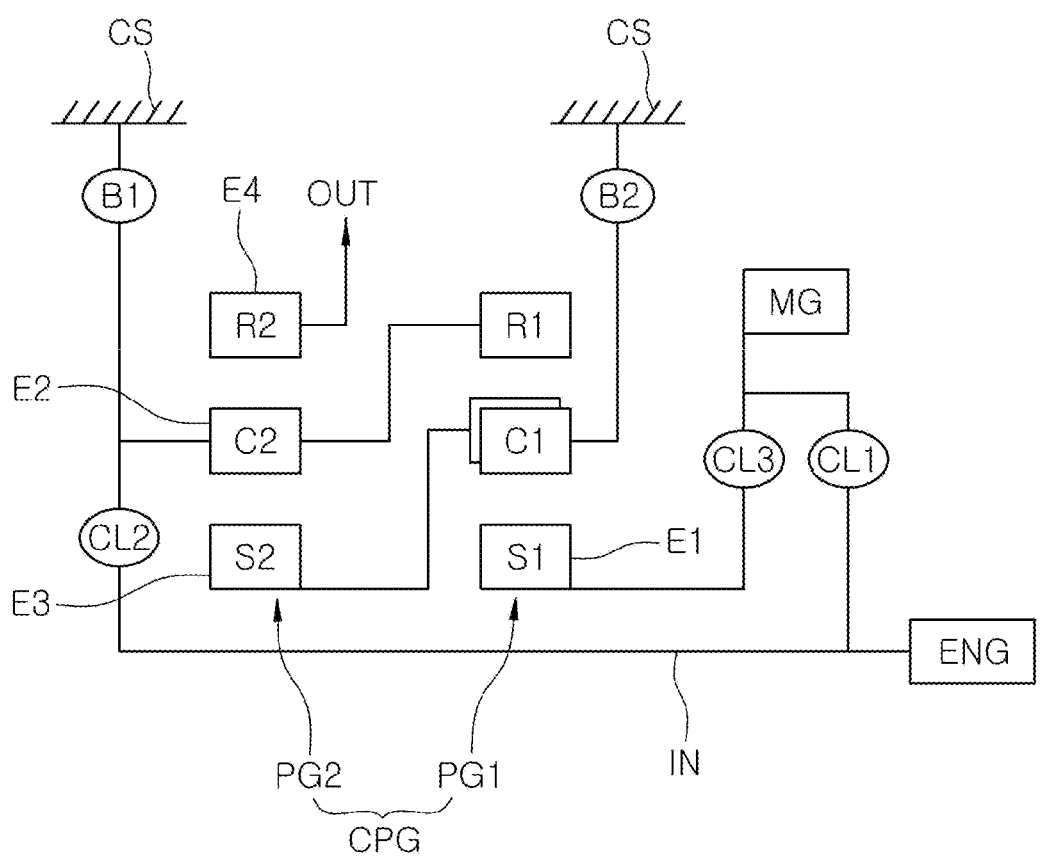
FIG. 14 is a diagram showing the configuration of a tenth form of a powertrain for a hybrid vehicle according to the present disclosure.

For reference, FIGS. 7 to 9 are exemplary speed graphs in each operation mode when the operation mode table of FIG. 6 is applied to the first form.

The first to fifth forms of FIGS. 1 to 5 further include a third clutch CL3 between the first rotary element E1 of the complex planetary gear set CPG and the motor generator MG and the third clutch CL3 is connected in series to the first clutch CL1 between the first rotary element E1 and the input shaft IN, whereby the first to fifth forms can be changed into sixth to tenth forms. The sixth to tenth forms are sequentially shown in FIGS. 10 to 14.

As described above, the sixth to tenth forms are almost the same as the first to fifth forms, respectively, except that the third clutch CL3 is provided, and the operation mode table for these cases is shown in FIG. 15.

That is, the sixth to tenth forms make it possible to avoid the situation in which the motor generator MG has to be rotated with a high number of revolutions by disengaging the third clutch CL3 when a vehicle is driven at the fourth stage in the engine mode.

Referring to FIGS. 16 to 19, the eleventh to fourteenth forms of a powertrain for a hybrid vehicle of the present disclosure commonly include: a complex planetary gear set CPG including four rotary elements; an input shaft IN connected with an engine ENG and installed to be able to be selectively connected to each of a first rotary element E1 and a second rotary element E2 of the complex planetary gear set CPG; a motor generator MG installed to be able to be independently connected to the first rotary element E1 and a third rotary element E3 of the complex planetary gear set CPG; a first brake B1 installed to be able to fix the second rotary element E2 of the complex planetary gear set CPG; a second brake B2 installed to be able to fixedly connect the third rotary element E3 of the complex planetary gear set CPG to the transmission case CS; and an output shaft OUT connected to a fourth rotary element E4 of the complex planetary gear set CPG.

The motor generator MG is connected to the first rotary element E1 and the third rotary element E3 of the complex planetary gear set CPG through a two-way device TWD and the two-way device TWD is configured to be able to independently connect the motor generator MG to the first rotary element E1 and the third rotary element E3 using two different pistons that are driven by hydraulic pressure.

Figure 20:
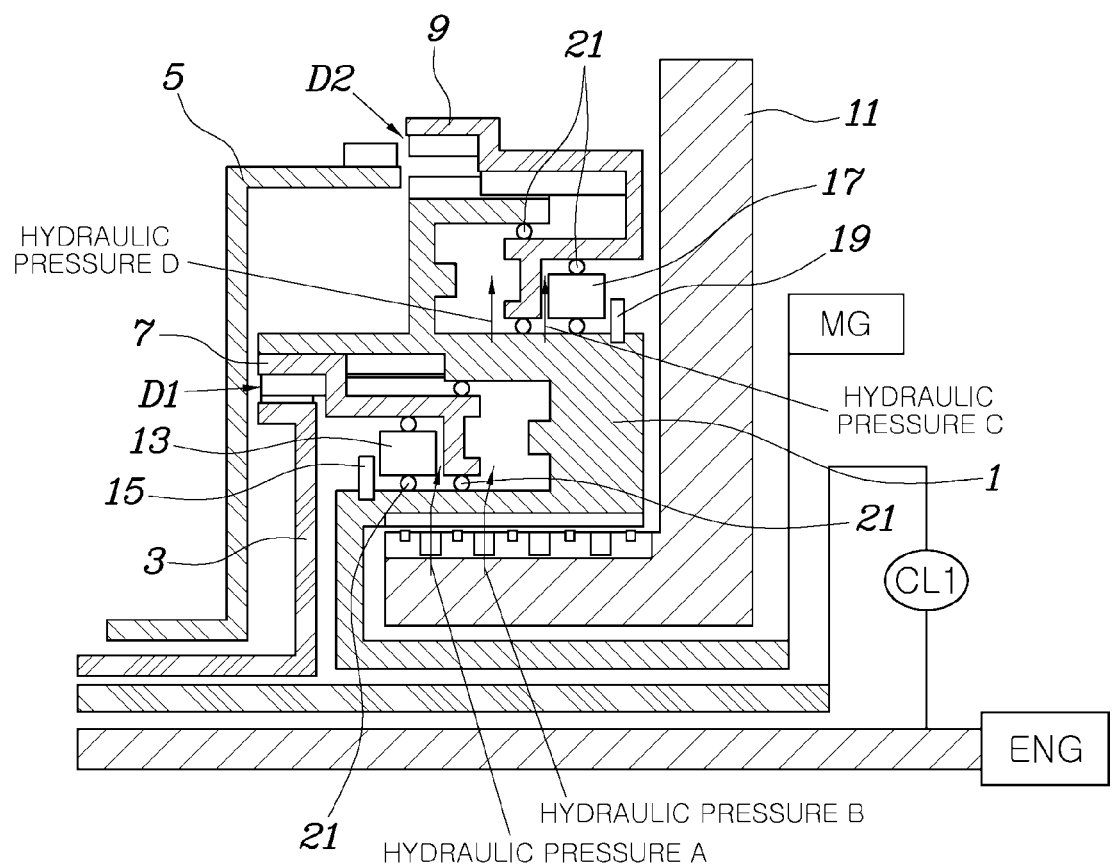
FIG. 20 is a diagram showing the configuration of a two-way mechanical that can be used in the eleventh to fourteenth forms of the present disclosure.

For example, the two-way device TWD, as shown in FIG. 20, may include: a retainer 1 connected to the motor generator MG; a first hub 3 connected to the first rotary element E1; a second hub 5 connected to the second rotary element E2; a first piston 7 sliding straight in the retainer 1 to be engaged with the first hub 3; a second piston 9 sliding straight in the retainer 1 to be engaged with the second hub 5; and a casing 11 surrounding the retainer 1, the first piston 7, and the second piston 9 and providing hydraulic pressure for driving the first piston 7 and the second piston 9.

The retainer 1 includes a first stopper 13 and a first snap ring 15 to limit the movement range of the first piston 7 and a second stopper 17 and a second snap ring 19 to limit the movement range of the second piston 9. The first piston 7, the second piston 9, the first stopper 13, and the second stopper 17 each have a seal ring 21 for sealing against oil.

In FIG. 20, the first piston 7 is in mesh with the first hub 3 such that the power of the motor generator MG can be transmitted to the first rotary element E1 through the retainer 1 and the first hub 3, and the second piston 9 is separated from the second hub 5.

In this state, when hydraulic pressure A is supplied and hydraulic pressure B is removed, the first piston 7 is separated from the first hub 3. On the contrary, when the hydraulic pressure B is supplied and the hydraulic pressure A is removed, the piston 7 is coupled to the first hub 3.

When hydraulic pressure C is supplied and hydraulic pressure D is removed, the second piston 9 is coupled to the second hub 5 such that the power of the motor generator MG can be transmitted to the third rotary element E3. On the contrary, when the hydraulic pressure C is removed and the hydraulic pressure D is supplied, the second piston 9 can be separated from the second hub 5.

As described above, the two-way device TWD can connect/disconnect the motor generator MG to/from each of the first rotary element E1 or the third rotary element E3 and can connect/disconnect the motor generator MG to/from both of the first rotary element E1 or the third rotary element E3, thereby having independent control ability.

A first clutch CL1 is disposed between the input shaft IN and the first rotary element E1 of the complex planetary gear set CPG, and a second clutch CL2 is disposed between the input shaft IN and the second rotary element E2 of the complex planetary gear set CPG.

The configuration described above are common in the eleventh to fourteenth forms, but the structure of the complex planetary gear set CPG is different in the forms.

Figure 16:
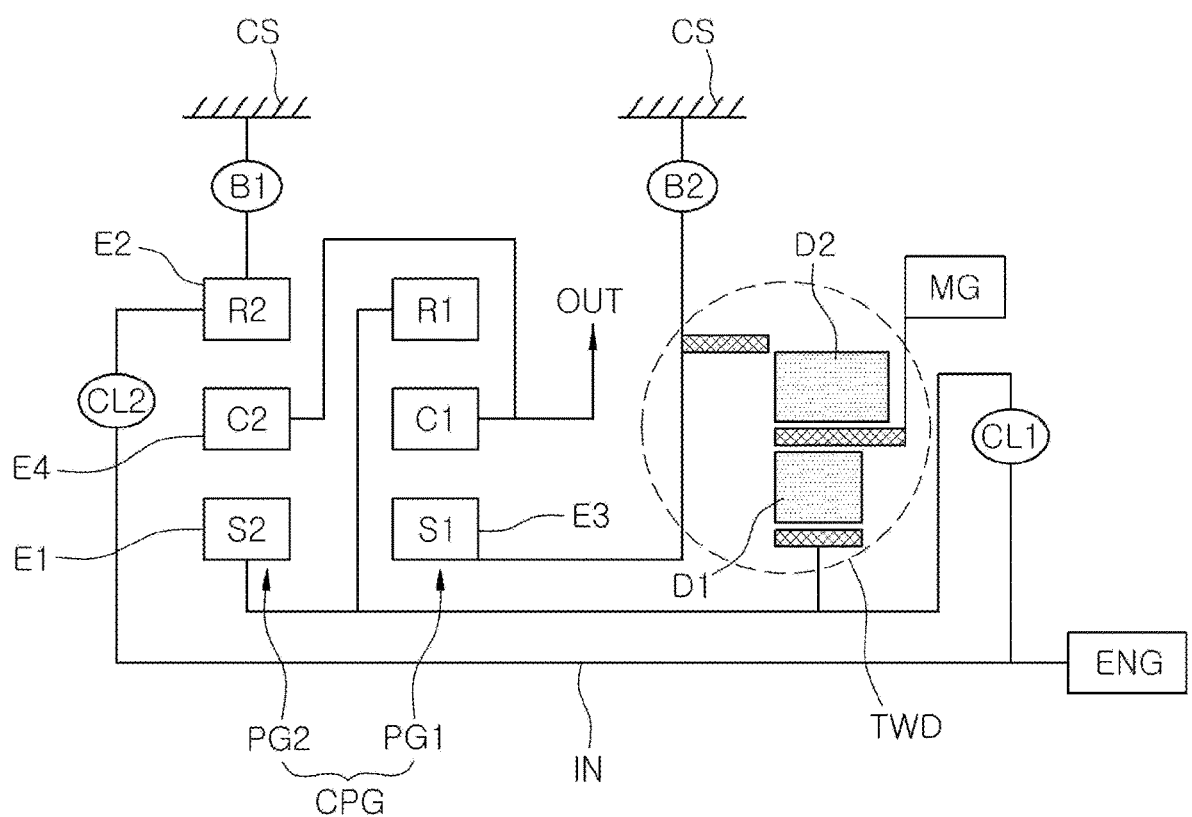
FIG. 16 is a diagram showing the configuration of an eleventh form of a powertrain for a hybrid vehicle according to the present disclosure.

In the eleventh form of FIG. 16, the complex planetary gear set CPG is composed of a first planetary gear set PG1 and a second planetary gear set PG2; the first rotary element E1 is implemented by connecting a first ring gear R1 of the first planetary gear set PG1 and a second sun gear S2 of the second planetary gear set PG2; the second rotary element E2 is a second ring gear R2 of the second planetary gear set PG2; the third rotary element E3 is a first sun gear S1 of the first planetary gear set PG1; and the fourth rotary element E4 is implemented by connecting a first carrier C1 of the first planetary gear set PG1 and a second carrier C2 of the second planetary gear set PG2.

Figure 17:
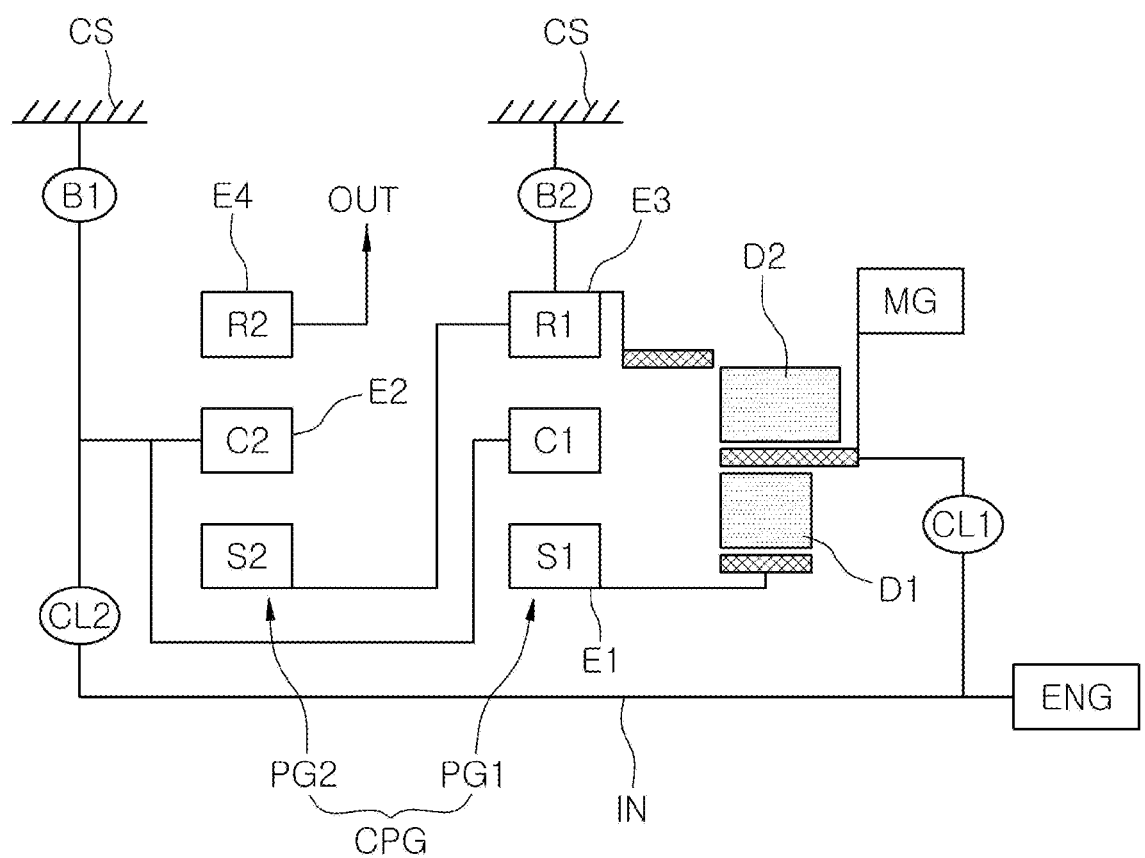
FIG. 17 is a diagram showing the configuration of a twelfth form of a powertrain for a hybrid vehicle according to the present disclosure.

In the twelfth form of FIG. 17, the complex planetary gear set CPG is composed of a first planetary gear set PG1 and a second planetary gear set PG2; the first rotary element E1 is a first sun gear S1 of the first planetary gear set PG1; the second rotary element E2 is implemented by connecting a first carrier C1 of the first planetary gear set PG1 and a second carrier C2 of the second planetary gear set PG2; the third rotary element E3 is implemented by connecting a first ring gear R1 of the first planetary gear set PG1 and a second sun gear S2 of the second planetary gear set PG2; and the fourth rotary element E4 is a second ring gear R2 of the second planetary gear set PG2.

Figure 18:
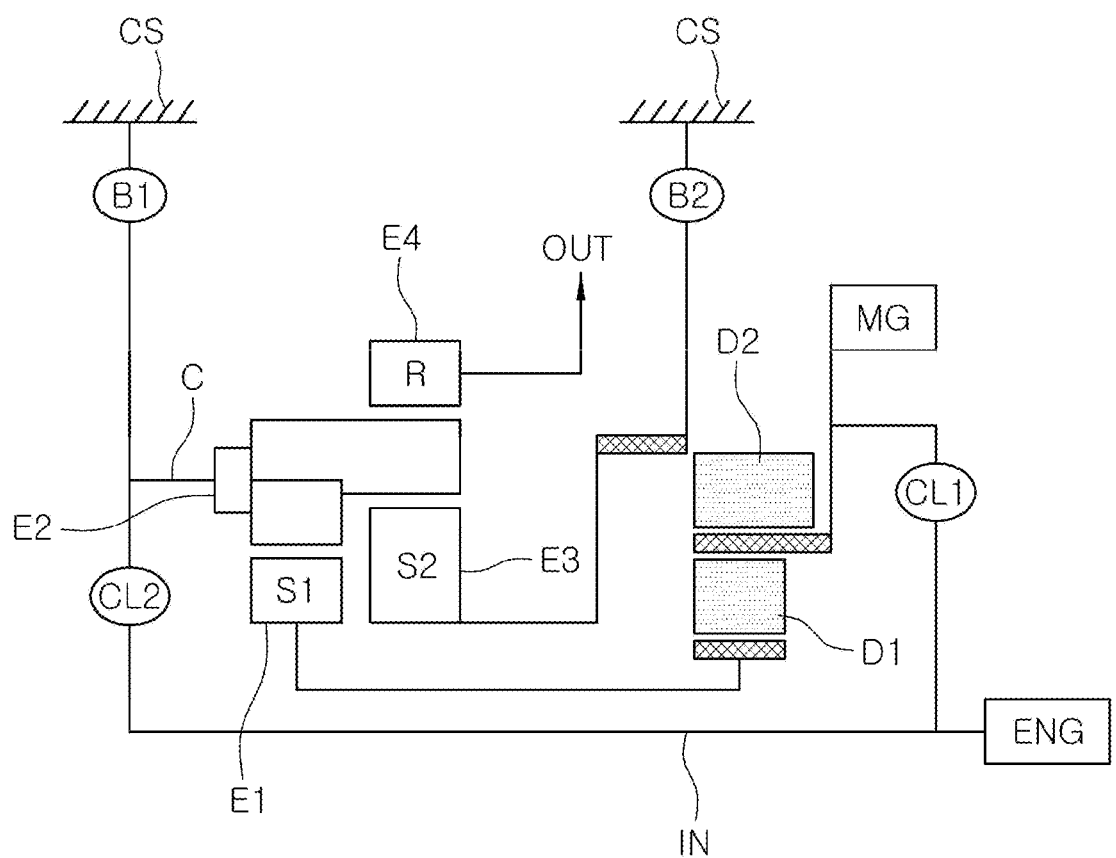
FIG. 18 is a diagram showing the configuration of thirteenth form of a powertrain for a hybrid vehicle according to the present disclosure.

In the thirteenth form of FIG. 18, the complex planetary gear set CPG is a Ravigneaux type planetary gear set; the first rotary element E1 is a first sun gear S1; the second rotary element E2 is a carrier C; the third rotary element E3 is a second sun gear S2, and the fourth rotary element E4 is a ring gear.

Figure 19:
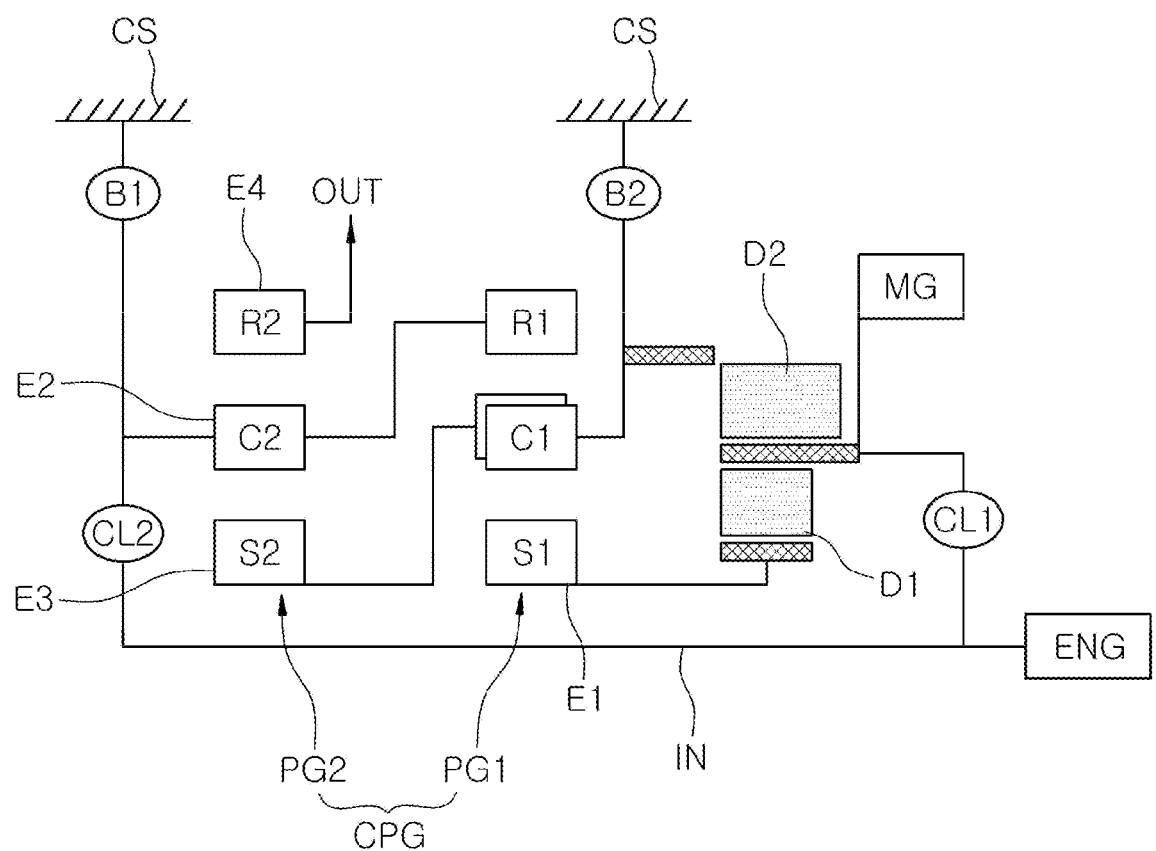
FIG. 19 is a diagram showing the configuration of a fourteenth form of a powertrain for a hybrid vehicle according to the present disclosure.

In the fourteenth form of FIG. 19, the complex planetary gear set CPG is composed of a double-pinion first planetary gear set PG1 and a single-pinion second planetary gear set PG2; the first rotary element E1 is a first sun gear S1 of the first planetary gear set PG1; the second rotary element E2 is implemented by connecting a first ring gear R1 of the first planetary gear set PG1 and a second carrier C2 of the second planetary gear set PG2; the third rotary element E3 is implemented by connecting a first carrier C1 of the first planetary gear set PG1 and a second sun gear S2 of the second planetary gear set PG2; and the fourth rotary element E4 is a second ring gear R2 of the second planetary gear set PG2.

That is, the complex planetary gear set CPG of the eleventh form is the same as that of the first form, the complex planetary gear set CPG of the twelfth form is the same as that of the second form, the complex planetary gear set CPG of the thirteenth form is the same as that of the third form, and the complex planetary gear set CPG of the fourteenth form is the same as that fifth form.

Figures 21, 22:
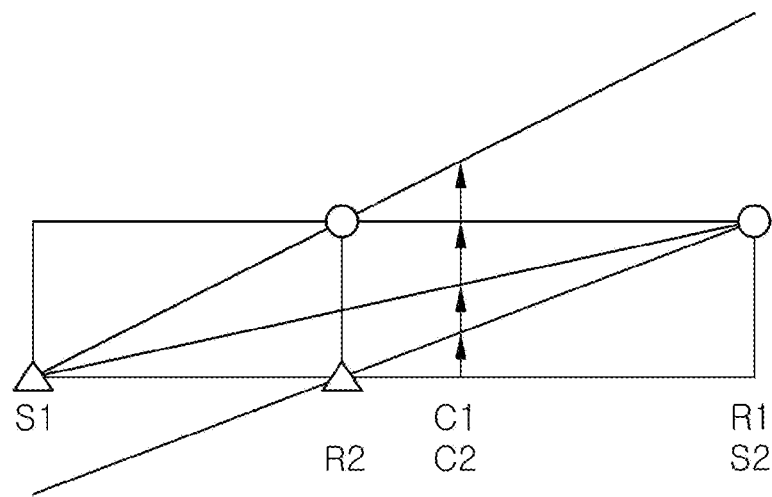
FIG. 21 is an operation mode table that can be applied to the eleventh to fourteenth forms of the present disclosure.
FIG. 22 is a speed graph when an engine mode shown in FIG. 21 is applied to the eleventh form.
Figure 23:
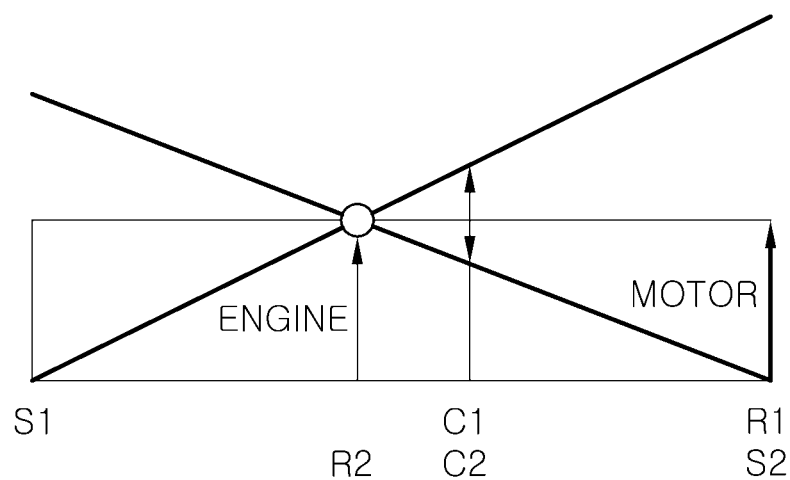
FIG. 23 is a speed graph when an e-CVT1 mode shown in FIG. 21 is applied to the eleventh form.
Figure 24:
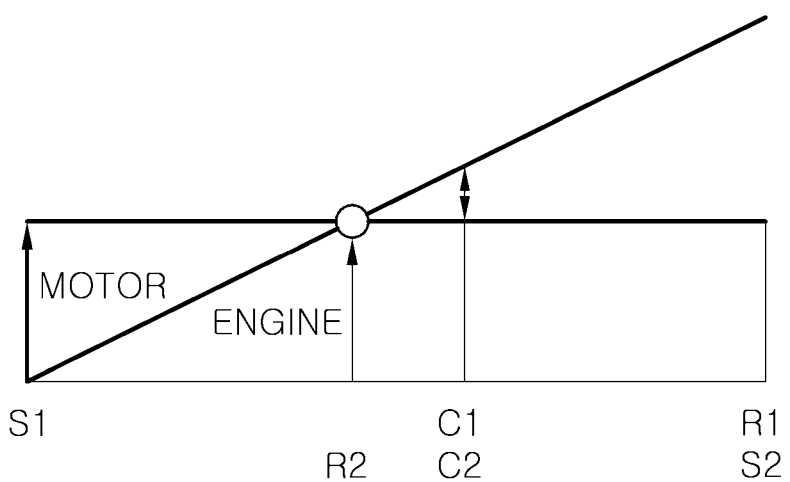
FIG. 24 is a speed graph when an e-CVT2 mode shown in FIG. 21 is applied to the eleventh form.
Figure 25:
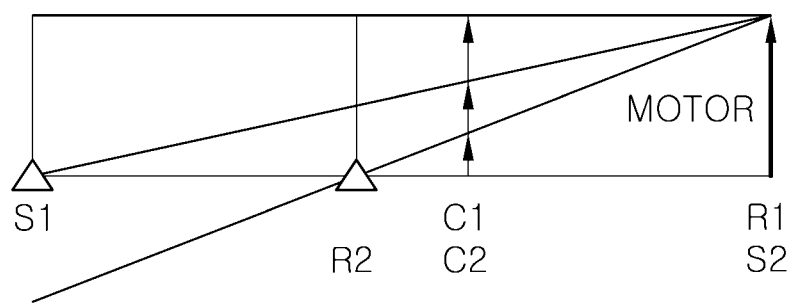
FIG. 25 is a speed graph when an EV mode shown in FIG. 21 is applied to the eleventh form.

In the eleventh to fourteenth forms, when a clutch function that connects or disconnects the first piston 7 to or from the first hub 3 is indicated by D1 and a clutch function that connects or disconnects the second piston 9 to or from the second hub 5, the operation mode table shown in FIG. 21 can be applied to the forms.

That is, it is possible to implement an engine mode in which first to fourth stages at which a vehicle is driven only by the power from an engine ENG are implemented, an e-CVT1 mode (electric Continuous Variable Transmission MODE) and an e-CVT2 mode in which gear ratio can be continuously changed by changing the power of a motor generator MG with the engine ENG in operation, an EV mode in which a first stage to a third stage at which a vehicle is driven only by the power from a motor generator MG are implemented, an in-stop charge mode in which charging is possible while a vehicle is stopped, etc.

The e-CVT2 mode can be implemented by adding the two-way device TWD, whereby the efficiency of the motor generator MG can be improved when the vehicle is driven at a high speed. Accordingly, the fuel efficiency of the vehicle can be improved.

Further, an EV3 stage is additionally implemented and 3-stage regenerative braking is possible, which can contribute to improving the fuel efficiency of the vehicle.

When the operation mode table of FIG. 21 is applied to the eleventh form of FIG. 16, the speed graphs in the operation mode are shown in FIGS. 22 to 25.

Although the present disclosure was described with reference to specific forms shown in the drawings, it is apparent to those skilled in the art that the present disclosure may be changed and modified in various ways without departing from the scope of the present disclosure.

What is claimed is:

1. A powertrain for a hybrid vehicle, comprising:
a complex planetary gear set including a first rotary element, a second rotary element, a third rotary element, and a fourth rotary element;
an input shaft connected with an engine and configured to be selectively connected to the first rotary element and the second rotary element of the complex planetary gear set;
a motor generator connected to the first rotary element of the complex planetary gear set;
a first brake configured to selectively connect the second rotary element of the complex planetary gear set to a transmission case;
a second brake configured to selectively connect the third rotary element of the complex planetary gear set to the transmission case; and
an output shaft connected to the fourth rotary element of the complex planetary gear set,
wherein a first clutch is disposed between the input shaft and the first rotary element of the complex planetary gear set, and a second clutch is disposed between the input shaft and the second rotary element of the complex planetary gear set, and
wherein:
the complex planetary gear set includes a first planetary gear set and a second planetary gear set;
the first rotary element is implemented by connecting a first ring gear of the first planetary gear set and a second sun gear of the second planetary gear set;
the second rotary element is a second ring gear of the second planetary gear set;
the third rotary element is a first sun gear of the first planetary gear set; and
the fourth rotary element is implemented by connecting a first carrier of the first planetary gear set and a second carrier of the second planetary gear set.

2. The powertrain of claim 1, further comprising:
a third clutch is disposed between the first rotary element of the complex planetary gear set and the motor generator,
wherein the third clutch is connected in series to the first clutch disposed between the first rotary element and the input shaft.

3. A powertrain for a hybrid vehicle, comprising:
a complex planetary gear set including a first rotary element, a second rotary element, a third rotary element, and a fourth rotary element;
an input shaft connected with an engine and configured to be selectively connected to the first rotary element and the second rotary element of the complex planetary gear set;
a motor generator configured to be independently connected to the first rotary element and the third rotary element of the complex planetary gear set;
a first brake configured to selectively connect the second rotary element of the complex planetary gear set to a transmission case;
a second brake configured to selectively connect the third rotary element of the complex planetary gear set to the transmission case; and
an output shaft connected to the fourth rotary element of the complex planetary gear set,
wherein:
the motor generator is connected to the first rotary element and the third rotary element of the complex planetary gear set through a two-way device,
the two-way device is configured to independently connect the motor generator to the first rotary element and the third rotary element using two different pistons that are driven by hydraulic pressure,
a first clutch is disposed between the input shaft and the first rotary element of the complex planetary gear set,
a second clutch is disposed between the input shaft and the second rotary element of the complex planetary gear set, and
wherein:
the complex planetary gear set includes a first planetary gear set and a second planetary gear set;
the first rotary element is implemented by connecting a first ring gear of the first planetary gear set and a second sun gear of the second planetary gear set;
the second rotary element is a second ring gear of the second planetary gear set;
the third rotary element is a first sun gear of the first planetary gear set; and
the fourth rotary element is implemented by connecting a first carrier of the first planetary gear set and a second carrier of the second planetary gear set.

4. The powertrain of claim 3, wherein the two-way device includes:
a retainer connected to the motor generator;
a first hub connected to the first rotary element;
a second hub connected to the second rotary element;
a first piston configured to slide straight in the retainer to be engaged with the first hub;
a second piston configured to slide straight in the retainer to be engaged with the second hub; and
a casing configured to surround the retainer, the first piston, and the second piston and configured to provide hydraulic pressure for driving the first piston and the second piston.

* * * * *